Dec. 8, 1925.
N. R. KRAUSE
ENSILAGE CUTTER
Filed May 16, 1925
1,564,586
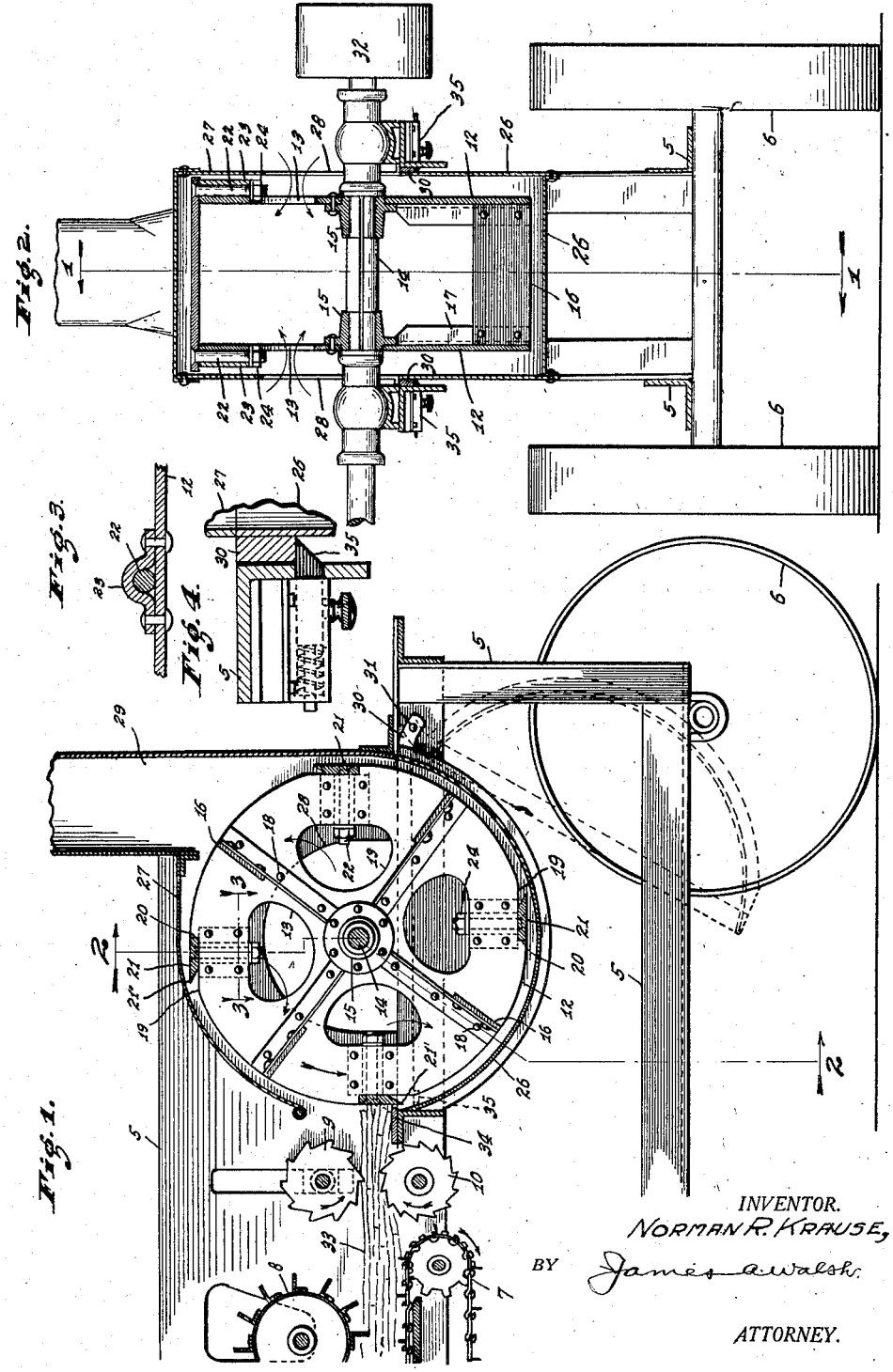
INVENTOR.
NORMAN R. KRAUSE,
BY James A. Walsh.
ATTORNEY.

Patented Dec. 8, 1925.

1,564,586

UNITED STATES PATENT OFFICE.

NORMAN R. KRAUSE, OF RACINE, WISCONSIN, ASSIGNOR TO J. I. CASE THRESHING MACHINE COMPANY, OF RACINE, WISCONSIN, A CORPORATION.

ENSILAGE CUTTER.

Application filed May 16, 1925. Serial No. 30,714.

*To all whom it may concern:*

Be it known that I, NORMAN R. KRAUSE, a citizen of the United States, residing at Racine, in the county of Racine and State of Wisconsin, have invented certain new and useful Improvements in Ensilage Cutters, of which the following is a specification.

The object of my invention is to provide an ensilage cutter of a highly efficient character capable of readily handling and cutting large quantities of material, the cutting and discharging instrumentality of which is considerably reduced in size comparatively to those of which I am aware but of equal or greater capacity, and consequently I am enabled to produce the same economically, as will be apparent from the following description.

In the accompanying drawing, forming part hereof, Figure 1 is a side elevation partially in section of an ensilage cutter embodying my improvement, as seen when looking in the direction of the arrows 1—1 in Fig. 2; Fig. 2 a transverse sectional view taken on the dotted line 2—2 in Fig. 1; Fig. 3 a detail section on the dotted line 3—3 in Fig. 1, and Fig. 4 a detail sectional view.

In said drawings the portions marked 5 indicate the frame of the machine, which may of any desired character, and 6 are wheels for supporting the same so that it will be rendered portable, as is common. As any suitable mechanism may be provided for feeding material to the cutter, such as the conveyer 7 and rolls 8, 9 and 10, these parts will only be referred to incidentally in describing the invention.

My improved cutter comprises a pair of disks, 12, provided with air inlets, 13, said disks being secured to a shaft, 14, by hubs, 15, or otherwise. Upon said disks 14 I mount in transverse relation to the peripheries thereof a series of fan blades, 16, which preferably are positioned between the disks and connected to brace members, 17, secured to said disks by rivets, 18, or otherwise. The peripheries of disks 14 are provided with recesses or knife seats, 19, terminating in stops, 20, and in which said seats I secure a series of cutting knives, 21, the arrangement being such that said fan blades and knives are disposed alternately about the disks 14, the knives being preferably in alignment with the air inlets 13. Said knives are positioned in the seats 19 with their rear sides abutting against stops 20, as clearly indicated in Fig. 1, their cutting edges, 21′, being beveled in a well known manner. The knives 21 are securely held in position by bolts, 22, passing therethrough and seated in socket members, 23, in which latter they are held in engagement by nuts, 24, in which manner I provide a simple means for the removal and replacement of the knives for sharpening or otherwise.

My improved cutting device is enclosed in a drum or casing embodying lower and upper sections, 26, 27, the walls of the latter having eyes, 28, therein, and provided with a discharge outlet, 29, to which is attached the usual pipe (not shown) for conveying and discharging material from the cutter. The lower drum section 26 is secured to frame 5 by the brace arms, 30, which are pivoted, at 31, so that should the cutter become unduly clogged with material requiring removal thereof the section 26 may be readily lowered by swinging the same on the pivoted brace arms 30, in which manner ready access may be had to the interior of the cutter for the purpose stated. Said section 26 is held in closed position by any suitable means, that illustrated (Fig. 4) being a spring-controlled latch, 35, preferably one on each side of said section, connected to frame 5 and adapted to engage and support brace arms 30.

In operation, the cutter is rotated by shaft 14 through pulley, 32, actuated from any source of power (not shown). Material, as 33, is constantly fed by a carrier, as 7, toward the cutter by rolls, as 8, 9 and 10, or otherwise, and as the material approaches the rapidly rotating cutter the knives 21, in connection with the shear plate 34, clip or cut the same into small portions which are carried around by the fan blades 16 and the air pressure created thereby to the outlet 29, through which latter the material is rapidly discharged by the action of said blades and the velocity of the air blast set up by the rotating cutter elements and which is constantly withdrawn centrally from the outside through the inlets of the drum and disks of the cutter, as described, and as indicated by the arrows in the drawing.

In the manner described, and as demonstrated in actual practice, I provide an ensilage cutter of compact character and high efficiency, comparatively simple in construction, and which may be produced at a minimum of cost.

I claim as my invention:

1. The combination, in an ensilage cutter, of a frame, material conveying mechanism associated with said frame, and a cutter comprising disks, cutting knives arranged transversely in relation to said disks, fan blades supported by said disks, a shaft upon which said cutter is mounted, and a casing enclosing said cutter and having a discharge outlet leading therefrom.

2. In an ensilage cutter, disks spaced apart, knives arranged transversely of said disks, means for securing said knives thereto, blades arranged transversely of said disks, and means for securing said blades in position.

3. In an ensilage cutter, disks spaced apart and having air inlets therein, knives arranged transversely of said disks, and blades arranged transversely of said disks, said knives and blades being positioned in alternate relation about the peripheries of said disks.

4. In an ensilage cutter, a pair of disks, cutting knives arranged peripherally about said disks, a shaft upon which said disks are mounted, a casing enclosing said disks, the lower portion of said casing being pivotally mounted to permit its adjustment toward and from said disks, and a discharge outlet for said casing.

5. In an ensilage cutter, a pair of disks having peripheral seats, cutting knives in said seats, means for removably securing said knives in said seats, fan blades supported by said disks and positioned adjacent the peripheries thereof, and means for rotatably supporting said cutter.

6. In an ensilage cutter comprising a pair of disks, knives disposed about the peripheries of said disks, and fan blades between and adjacent the peripheries of said disks.

7. In an ensilage cutter, a casing embodying an air inlet, a rotatable cutter comprising disks having air inlets therein and enclosed in said casing, knives arranged transversely of said disks for cutting material, and fan blades for discharging such material.

8. An ensilage cutter comprising a pair of disks, knives arranged transversely of said disks, fan blades between said knives, and a casing enclosing said cutter embodying an inlet through which material is conveyed and an outlet through which such material is pneumatically discharged by the action of said cutter.

In testimony whereof I affix my signature.

NORMAN R. KRAUSE.